(12) United States Patent
Becker

(10) Patent No.: US 10,414,670 B2
(45) Date of Patent: Sep. 17, 2019

(54) SYSTEMS AND METHODS FOR DISTILLATION OF WATER FROM SEAWATER, BRACKISH WATER, WASTE WATERS, AND EFFLUENT WATERS

(71) Applicant: Global Water Farms Corporation, Sacramento, CA (US)

(72) Inventor: Jonathan Becker, Avon, CO (US)

(73) Assignee: Global Water Farms Corporation, Sacramento, CA (US)

( * ) Notice: Subject to any disclaimer, the term of this patent is extended or adjusted under 35 U.S.C. 154(b) by 0 days.

(21) Appl. No.: 16/209,742

(22) Filed: Dec. 4, 2018

(65) Prior Publication Data

US 2019/0106336 A1    Apr. 11, 2019

Related U.S. Application Data

(63) Continuation-in-part of application No. 15/246,115, filed on Aug. 24, 2016, now Pat. No. 10,144,655.
(Continued)

(51) Int. Cl.
*C02F 1/14* (2006.01)
*B01D 1/14* (2006.01)
(Continued)

(52) U.S. Cl.
CPC .............. *C02F 1/14* (2013.01); *B01D 1/0035* (2013.01); *B01D 1/14* (2013.01); *C02F 2103/08* (2013.01);
(Continued)

(58) Field of Classification Search
CPC ..... C02F 1/04; C02F 1/10; C02F 1/14; B01D 1/00; B01D 1/14
See application file for complete search history.

(56) References Cited

U.S. PATENT DOCUMENTS 3,441,482 A    4/1969  Avery
3,509,716 A    5/1970  Avery
(Continued)

FOREIGN PATENT DOCUMENTS

DE    19940992    3/2001
EP    738686    10/1996
(Continued)

OTHER PUBLICATIONS

International Search Report and Written Opinion for International (PCT) Patent Application No. PCT/US2016/48417, dated Oct. 31, 2016.
(Continued)

*Primary Examiner* — Brian A McCaig
(74) *Attorney, Agent, or Firm* — Sheridan Ross P.C.

(57) ABSTRACT

The present invention relates to water purification using solar energy. More specifically, systems and methods according to the present invention collect solar energy to heat non-potable water in a super-insulated structure. Compressed heated air is injected to evaporate water vapor out of brackish water, saltwater, or dirty water, thereby creating saturated air. The saturated air is drawn through a cooling tower and distilled water is precipitated. The systems and methods employ heat recovery and recycling processes to maximize energy efficiency.

6 Claims, 8 Drawing Sheets

Related U.S. Application Data

(60) Provisional application No. 62/209,277, filed on Aug. 24, 2015.

(51) Int. Cl.
*B01D 1/00* (2006.01)
*C02F 103/08* (2006.01)

(52) U.S. Cl.
CPC .... *C02F 2201/009* (2013.01); *C02F 2303/10* (2013.01)

(56) References Cited

U.S. PATENT DOCUMENTS

| | | | |
|---|---|---|---|
| 4,153,955 A | 5/1979 | Hinterberger | |
| 4,210,494 A | 7/1980 | Rhodes | |
| 4,240,210 A | 12/1980 | Huang | |
| 4,253,307 A | 3/1981 | Smith | |
| 4,603,685 A | 8/1986 | Jean et al. | |
| 4,680,090 A | 7/1987 | Lew | |
| 4,978,458 A | 12/1990 | Inagaki et al. | |
| 5,004,535 A | 4/1991 | Bosko et al. | |
| 5,106,495 A | 4/1992 | Hughes | |
| 5,181,991 A | 1/1993 | Deutsch | |
| 5,609,733 A | 3/1997 | Burton | |
| 5,690,740 A * | 11/1997 | Smith | B05B 12/18 118/300 |
| 6,274,004 B1 | 8/2001 | Andersen | |
| 6,656,326 B2 | 12/2003 | Nagler | |
| 6,863,827 B2 | 3/2005 | Saraceno | |
| 8,343,315 B2 | 1/2013 | Siskin et al. | |
| 8,419,904 B2 | 4/2013 | BaAbbad et al. | |
| 2006/0180460 A1 | 8/2006 | Nagler | |
| 2007/0157922 A1 | 7/2007 | Radhakrishnan et al. | |
| 2011/0186529 A1 | 8/2011 | Wright | |
| 2017/0081211 A1 * | 3/2017 | Becker | B01D 1/0035 |

FOREIGN PATENT DOCUMENTS

| | | |
|---|---|---|
| WO | WO 2003/031341 | 4/2003 |
| WO | WO 2009/103112 | 8/2009 |
| WO | WO 2015/004650 | 1/2015 |
| WO | WO 2015/103559 | 7/2015 |

OTHER PUBLICATIONS

International Preliminary Report on Patentability for International (PCT) Patent Application No. PCT/US2016/48417, dated Mar. 8, 2018, 10 pages.
Notice of Allowance for U.S. Appl. No. 15/246,115, dated Oct. 23, 2018, 8 pages.

* cited by examiner

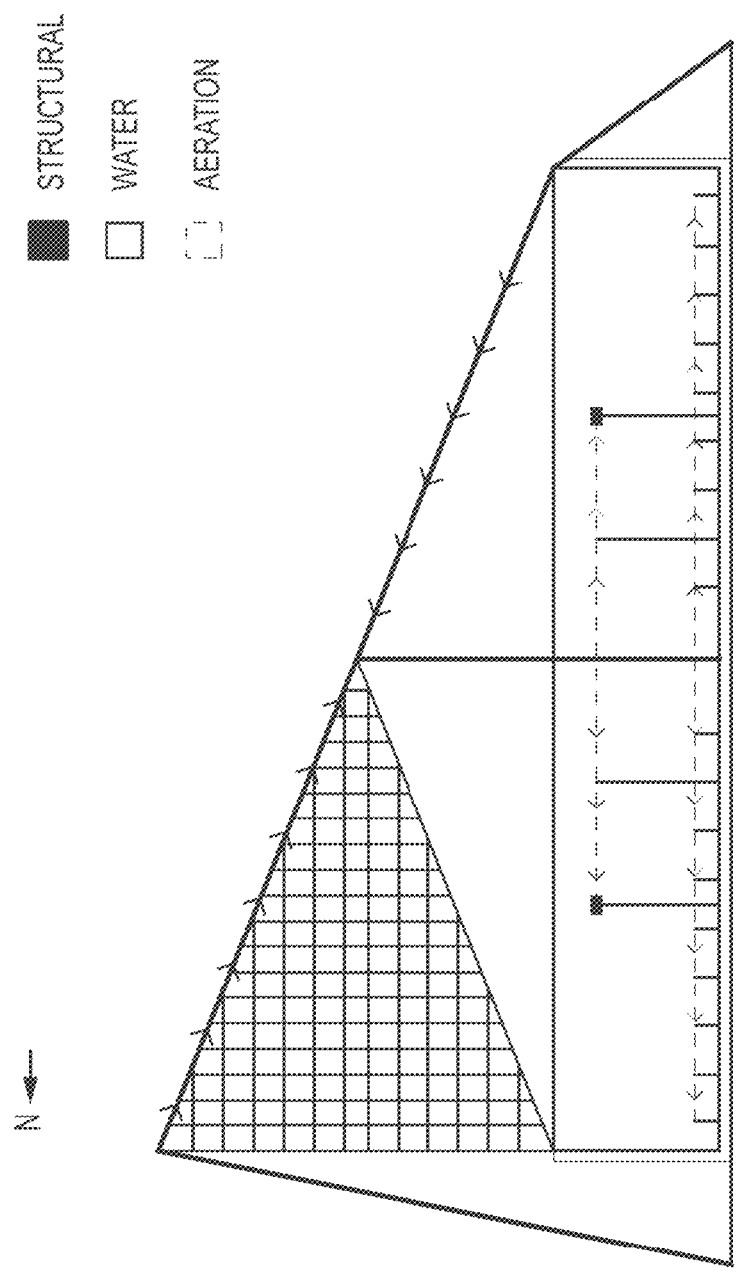

SYSTEMS AND METHODS FOR DISTILLATION OF WATER FROM SEAWATER, BRACKISH WATER, WASTE WATERS, AND EFFLUENT WATERS

CROSS-REFERENCE TO RELATED APPLICATIONS

This application is a continuation-in-part and claims the benefit of U.S. patent application Ser. No. 15/246,115, filed 24 Aug. 2016, which claims the benefit of U.S. Provisional Patent Application 62/209,277, filed 24 Aug. 2015. The entireties of both of the above-referenced previously filed applications are incorporated herein by reference.

FIELD OF THE INVENTION

The present invention relates to water purification, and more specifically to the distillation of brackish water, saltwater, or dirty water using solar energy.

BACKGROUND OF THE INVENTION

Currently, the two main methods known for water desalination are reverse osmosis (RO) and multiple effect distillation (MED). These methods can be expensive; typically, large-scale RO systems produce clean water at a cost of between $1.50 and $2.00 per cubic meter, and MED systems produce clean water a cost of between $0.70 and $1.50 per cubic meter. As a result, small or cash-strapped communities are often unable to pursue desalination to meet their needs for clean water and are forced to rely on other sources, which may have more pronounced environmental consequences.

In addition, RO and MED themselves have a number of environmental and economic drawbacks. Many RO and MED plants emit concentrated brine as a waste product; this brine can be toxic to the marine environment in the surrounding area. RO and MED systems are also notoriously fragile and unreliable, and often shut down even when only a single part fails. RO has a particularly strong negative effect on environment because it relies on filter membranes, the manufacture of which creates industrial wastes, and requires significant quantities of electrical power. MED uses less electrical power than RO, but requires a steam source in addition to an electrical source; many methods of generating steam have severe environmental impacts.

There is thus a need for systems and methods of water purification that do not emit a concentrated brine solution into the surrounding environment, but preferably utilizes the waste brine productively. It is advantageous for such systems and methods to utilize inexpensive, easily acquired components to produce clean water at the lowest possible cost, and to produce few or no toxic after-products. It is further advantageous for such systems to be designed robustly, such that the system can continue to operate despite the failure of a single component or subsystem, and to be effective for both desalination and remediation of dirty water.

BRIEF SUMMARY OF CERTAIN EMBODIMENTS OF THE INVENTION

It is one aspect of embodiments of the present invention to provide a system for purifying water, comprising a solar energy collection device, collecting solar energy and heating a heat transfer fluid in a heat exchanger, the heat exchanger receiving and heating non-potable water; a super-insulated structure; a distilled water reservoir; and a concentrated effluent reservoir. The super-insulated structure comprises a distillation tower, receiving the heated non-potable water; a high-volume low-pressure (HVLP) blower, compressing intake air to form compressed air having a temperature of between about 208° F. and about 210° F., and injecting the compressed air into the distillation tower to form saturated air and a concentrated effluent in the distillation tower, wherein the compressed air enters the distillation tower via a plurality of microbubble nozzles located at a vertical midpoint of a water column comprising the heated non-potable water and the concentrated effluent; a cooling tower, receiving the saturated air from the distillation tower and comprising a plurality of cooling coils, the plurality of cooling coils cooling the saturated air to form distilled water and cool, dry air; a reheat tower, receiving at least a portion of the cool, dry air from the cooling tower, heating the portion of the cool, dry air to form preheated air, and providing the preheated air to the HVLP blower as at least a portion of the intake air; a heat recovery means for recovering at least a portion of waste heat generated by the system; and a chiller, chilling at least one of air and water used by the cooling coils of the cooling tower, returning the at least one of air and water to the cooling coils, and expelling waste heat to the reheat tower for use in heating the portion of the cool, dry air. The distilled water reservoir receives the distilled water from the cooling tower. The concentrated effluent reservoir receives the concentrated effluent from the distillation tower for subsequent treatment.

In embodiments, the super-insulated structure may be made substantially of concrete.

In embodiments, the super-insulated structure may be made substantially of steel.

In embodiments, the super-insulated structure may form a box structure.

In embodiments, the solar energy collection device may comprise a parabolic trough solar collector.

In embodiments, the heat transfer fluid may comprise at least one of a synthetic oil and a molten salt.

In embodiments, the system may further comprise a pump configured to pump the distilled water in the distilled water reservoir into a supply pipeline.

In embodiments, the heat recovery means may recover waste heat generated by the HVLP blower.

In embodiments, the heat recovery means may recover waste heat generated by the chiller.

In embodiments, the non-potable water may comprise saltwater.

It is another aspect of embodiments of the present invention to provide a method for purifying water, comprising (a) collecting solar energy; (b) heating a heat transfer fluid with the collected solar energy; (c) heating non-potable water by heat exchange with the heat transfer fluid; (d) compressing intake air to form compressed air having a temperature of between about 208° F. and about 210° F.; (e) combining the heated non-potable water and the compressed air in a distillation tower to form saturated air and a concentrated effluent, wherein the compressed air is injected into the distillation tower by a plurality of microbubble nozzles located at a vertical midpoint of a water column comprising the heated non-potable water and the concentrated effluent; (f) cooling the saturated air to form distilled water and cool, dry air; (g) heating at least a portion of the cool, dry air to form preheated air for recycle as at least a portion of the intake air; (h) collecting the distilled water; and (i) collecting the concentrated effluent for subsequent treatment.

In embodiments, at least steps (d) through (g) may be carried out in a super-insulated structure made substantially of concrete to minimize heat loss.

In embodiments, at least steps (d) through (g) may be carried out in a super-insulated structure made substantially of steel to minimize heat loss.

In embodiments, step (a) may be carried out by a parabolic trough solar collector.

In embodiments, the heat transfer fluid may comprise at least one of a synthetic oil and a molten salt.

In embodiments, the method may further comprise pumping the collected distilled water into a supply pipeline.

In embodiments, the method may further comprise recovering at least a portion of waste heat generated by any one or more of steps (b) through (g). By way of non-limiting example, at least a portion of waste heat generated by step (d) may be recovered, and/or at least a portion of waste heat generated by step (f) may be recovered.

In embodiments, the non-potable water may comprise saltwater.

While specific embodiments and applications of the present invention have been illustrated and described, it is to be understood that the invention is not limited to the precise configuration and components described herein. Various modifications, changes, and variations which will be apparent to those skilled in the art may be made in the arrangement, operation, and details of the methods and systems of the present invention disclosed herein without departing from the spirit and scope of the invention. It is important, therefore, that the claims be regarded as including any such equivalent construction insofar as they do not depart from the spirit and scope of the present invention.

The advantages of the present invention will be apparent from the disclosure contained herein.

For purposes of further disclosure and to comply with applicable written description and enablement requirements, the following references generally relate to apparatus, methods, and systems for purifying water and related apparatus, methods, and systems, and are hereby incorporated by reference in their entireties:

U.S. Pat. No. 3,441,482, entitled "Solar energy water purification apparatus," issued 29 Apr. 1969 to Avery ("Avery I"). Avery I describes an apparatus for purification of impure water by humidification using solar energy as a heat source, comprising an impure water heating pool covered by a material to prevent water evaporation therefrom while promoting absorption of solar energy into the heating pool, a solar energy still having an oscillating thermodynamic motor to aid vaporization of the water therein, and a rotary thermodynamic motor to circulate the impure water between the pool and the still.

U.S. Pat. No. 3,509,716, entitled "Solar energy thermodynamic motor," issued 5 May 1970 to Avery ("Avery II"). Avery II describes an apparatus for purification of impure water by humidification using solar energy as a heat source, comprising an impure water heating pool covered by a material to prevent water evaporation therefrom while promoting absorption of solar energy into the heating pool, a solar energy still having an oscillating thermodynamic motor to aid vaporization of the water therein, and a rotary thermodynamic motor to circulate the impure water between the pool and the still.

U.S. Pat. No. 4,153,955, entitled "Solar energy converter," issued 15 May 1979 to Hinterberger ("Hinterberger"). Hinterberger describes a solar energy converter employing a stationary mirror which reflects and focuses solar radiation onto a bank of contiguous radiation concentrators through which a liquid is selectively passed as the focused radiation passes thereacross as the elevation of the sun changes during the day.

U.S. Pat. No. 4,240,210, entitled "Method and apparatus for utilizing solar energy in a water and waste management system," issued 23 Dec. 1980 to Huang ("Huang"). Huang describes a method and apparatus for utilizing solar energy in a water and/or waste management system, in which at least one rotary chamber having a porous or perforated outer wall structure and an inner disposed filter is oriented within a drying structure having a transparent surface of substantial area for allowing solar radiation to be directed through the drying structure onto said rotary chamber.

U.S. Pat. No. 4,253,307, entitled "Solar power generator and water purifier," issued 3 Mar. 1981 to Smith ("Smith"). Smith describes a combined solar power generator and water purifier including a hollow globular boiler floating on and anchored atop a body of water to be purified.

U.S. Pat. No. 4,978,458, entitled "Method of purifying water for drink with solar light and heat and apparatus used for the same method," issued 18 Dec. 1990 to Inagaki et al. ("Inagaki"). Inagaki describes a method of purifying water by processing raw water with a high density light beam obtained by condensing solar light to obtain drinking water, and an apparatus for carrying out the same method. The apparatus comprises a light condenser for condensing solar light to obtain a high density light beam and a heat-resistant glass tube having a transparent section for passing original water through a portion corresponding to a focal point of the light condenser.

U.S. Pat. No. 5,004,535, entitled "Water purification system," issued 2 Apr. 1991 to Bosko et al. ("Bosko"). Bosko describes a reverse osmosis water purification system including a support structure dimensioned and arranged to facilitate manual transportation, purification components mounted on the support structure for producing product water and waste water from feedwater by reverse osmosis, and pump components mounted on the support structure for pumping feedwater from a separate source to the purification means.

U.S. Pat. No. 5,106,495, entitled "Portable water purification device," issued 21 Apr. 1992 to Hughes ("Hughes"). Hughes describes a portable ozonization system having a tank mounted on a base housing a battery, pump, and associated components. A photovoltaic battery charger is mounted on a surface of the tank. Water from the tank is periodically circulated from under the control of a low-voltage DC timer by the pump through a venturi where it is subjected to DC-generated ultraviolet radiation to treat viruses, cysts, bacteria, and organic material.

U.S. Pat. No. 5,181,991, entitled "Solar water purification device," issued 26 Jan. 1993 to Deutsch ("Deutsch"). Deutsch describes a solar water purification apparatus that includes a first and a second preheater, an evaporation load tank, a condenser, and a pure distillate collecting tank.

European Patent Application Publication No. 738,686, entitled "Reactors for photocatalytic waste-water purification with the use of multi-layered cross-braced plates as solar elements," published 23 Oct. 1996 to Benz et al. ("Benz"). Benz describes a reactor for photocatalytic purification of waste liquor having a solar cell of spaced laminated plates of thermoplastic extrudable and/or transparent or translucent plastics containing a photocatalyst, through which the liquor can flow.

German Patent Application Publication No. 19940992, entitled "Water purification plant powered exclusively by solar energy employs coolant circuit evaporating e.g. salt water, without use of coolant compressor or coolant pumping," published 1 Mar. 2001 to Korb et al. ("Korb"). Korb describes methods of evaporating sea-, salt-, brackish, river, or lake water by a solar energy-heated and operated coolant circuit, without use of a coolant compressor and/or without using a pump in the coolant circuit.

U.S. Pat. No. 6,274,004, entitled "Water purification device," issued 14 Aug. 2001 to Andersen ("Andersen"). Andersen describes a water purification and/or desalination plant for producing drinking water from a polluted water source or sea water with the aid of sunlight, which plant includes an evaporator having a roof part made of a light-penetrable material, and an underlying basin part containing the water that is to be purified, which basin part includes channels for collecting water vapor that has been condensed on the inside of the roof part, and a reservoir for purified water.

PCT Application Publication No. 2003/031341, entitled "Mobile cube for the production of energy and the purification of water by reverse osmosis and similar techniques," published 17 Apr. 2003 to Niederer et al. ("Niederer"). Niederer describes a mobile cube mounted on wheels or stilts, with a solar panel on each of the free lateral and upper surfaces.

U.S. Pat. No. 6,656,326, entitled "Apparatus and method for water purification using solar energy," issued 2 Dec. 2003 to Nagler ("Nagler I"). Nagler I describes an apparatus for the desalination or purification of water comprising a non-solid vessel having a bottom defining an opening, the vessel capable of being partially submerged below the surface of a body of water, a pan located within the vessel, the pan being flexibly connected to the inner wall of the vessel and being located beneath the surface of the water, a lens fixably connected to the top of the vessel, wherein the lens is focused beneath the surface of the water and above the surface of the pan, means for varying the orientation of the vessel in accordance with the location of the sun, and means for condensing steam generated in the non-solid vessel, whereby steam generated in the non-solid vessel is condensed outside of the non-solid vessel.

U.S. Pat. No. 6,863,827, entitled "Solar powered portable water purifier," issued 8 Mar. 2005 to Saraceno ("Saraceno"). Saraceno describes a water purification system and associated method consisting of a generally self-contained, highly maneuverable, portable water purification system.

U.S. Patent Application Publication No. 2006/0180460, entitled "Apparatus and method for water purification using solar energy," published 17 Aug. 2006 to Nagler ("Nagler II"). Nagler II describes an apparatus for the desalination or purification of water comprising a non-solid vessel having a bottom defining an opening, the vessel capable of being partially submerged below the surface of a body of water, a pan located within the vessel, the pan being flexibly connected to the inner wall of the vessel and being located beneath the surface of the water, a lens fixably connected to the top of the vessel, wherein the lens is focused beneath the surface of the water and above the surface of the pan, means for varying the orientation of the vessel in accordance with the location of the sun, and means for condensing steam generated in the non-solid vessel, whereby steam generated in the non-solid vessel is condensed outside of the non-solid vessel.

U.S. Patent Application Publication No. 2007/0157922, entitled "Integrated electrical and thermal energy solar cell system," published 12 Jul. 2007 to Radhakrishnan et al. ("Radhakrishnan"). Radhakrishnan describes an integrated solar cell system which applies energy created by a solar cell module. The integration system includes a solar cell module, a low-grade heat recovery means, and a process system. The low-grade heat recovery means recovers waste heat from the solar cell module and connects the solar cell module to the process system. The process system is powered at least partially by thermal energy derived from waste heat generated by the solar cell module.

U.S. Patent Application Publication No. 2011/0186529, entitled "Solar-powered water purification system," published 4 Aug. 2011 to Wright ("Wright"). Wright describes a water purification apparatus comprising at least one water purification filter and a solar-powered pump configured to pump source water through the at least one water purification filter, producing purified water.

U.S. Pat. No. 8,343,315, entitled "Integrated solar thermal and nuclear enabled water purification and hydrocarbon refining processes," issued 1 Jan. 2013 to Siskin et al. ("Siskin"). Siskin describes methods of making saline water suitable for use in large quantities in petroleum refining operations by evaporative desalination of a water source having a dissolved salt content of at least 30,000 ppmw with the heat liberated during the steam condensation used as low-quality heat for petroleum refining operations.

U.S. Pat. No. 8,419,904, entitled "Systems and methods for solar water purification," issued 16 Apr. 2013 to Ba-Abbad et al. ("Ba-Abbad"). Ba-Abbad describes a system for solar water purification including a sun-tracking reflecting mirror unit and a two-axis Fresnel concentrator mirror unit to collect sunlight reflected from the sun-tracking reflecting mirror unit and focus the sunlight.

As used herein, "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

It is to be noted that the term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The embodiments and configurations described herein are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIGS. 2A, 2B, and 2C are top, front, and side views, respectively, of a heat trapping tank for a water purification system, according to embodiments of the present invention;

DETAILED DESCRIPTION OF THE INVENTION

Figure 1:
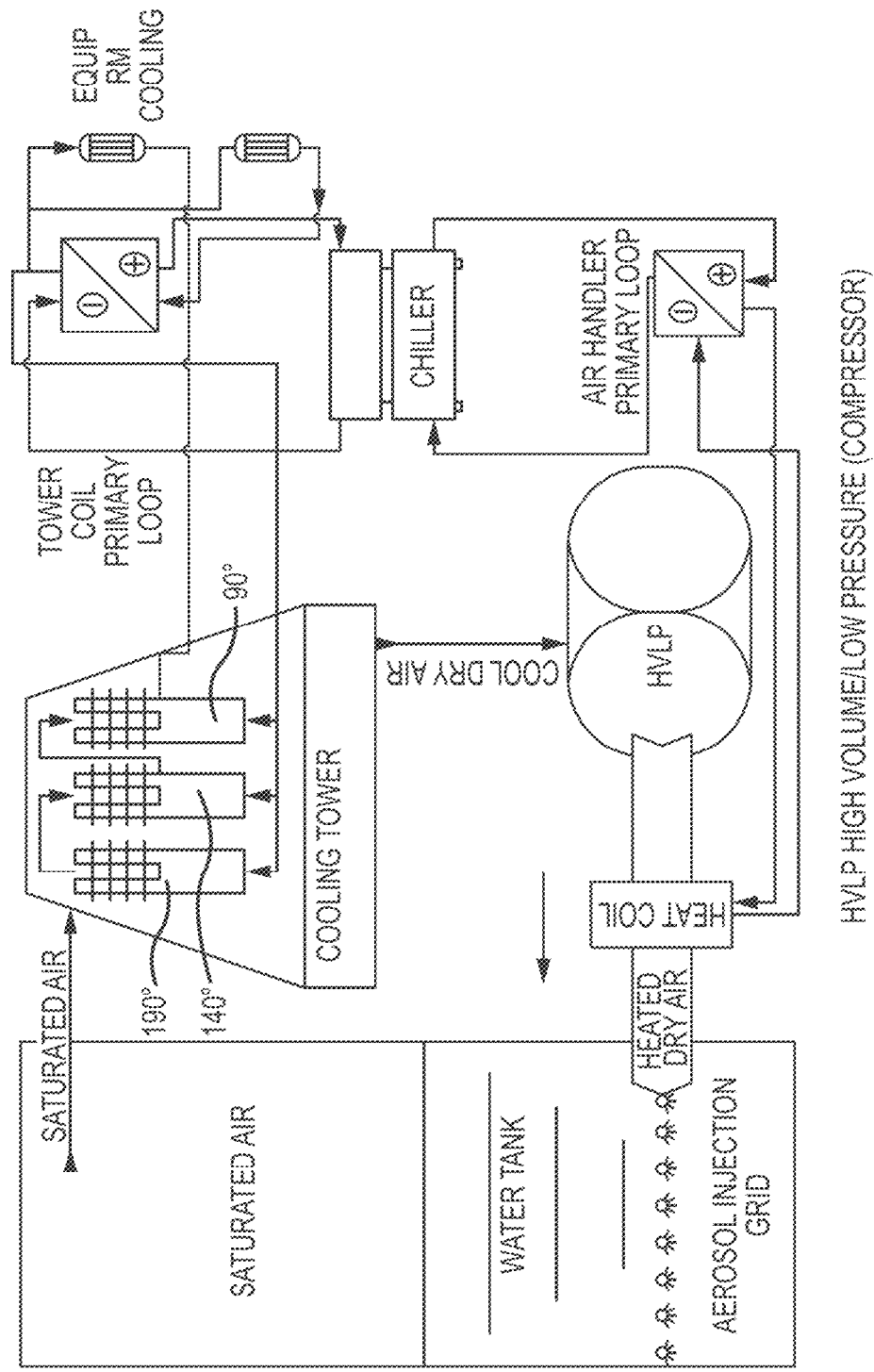
FIG. 1 is a schematic diagram of a water purification system, according to embodiments of the present invention.

Referring now to FIG. 1, a water purification system is illustrated, comprising three subsystems: a heat trapping tank, a cooling tower, and an equipment and control room. In the system of FIG. 1, non-potable water, such as seawater, brackish water, industrial waste water, treated effluent water, or mixtures thereof, is retained in the heat trapping tank and heated. The energy by which the non-potable water is heated may come from any one or more of several sources, including but not limited to trapped solar energy, injected hot air, and recycled waste heat energy. As a result of the heating of the non-potable water, water vapor evaporates from the non-potable water and saturates the air within the heat trapping tank. The saturated air is then provided to the cooling tower. Within the cooling tower, heat is removed from the saturated air, which causes water vapor within the saturated air to condense and collect within a reservoir in the cooling tower. In embodiments, the now-cooled, dry air may then be passed by a high-volume low-pressure (HVLP) blower through a heating coil and returned to the heat trapping tank as injected hot air, which can heat the non-potable water therein. The equipment and control room monitors and controls the various components and processes of the system and may, in embodiments, comprise a heat recovery subsystem that allows waste heat energy generated by equipment in the equipment and control room to be provided to the heat trapping tank to assist in evaporating water vapor from the non-potable water.

Figure 2A:
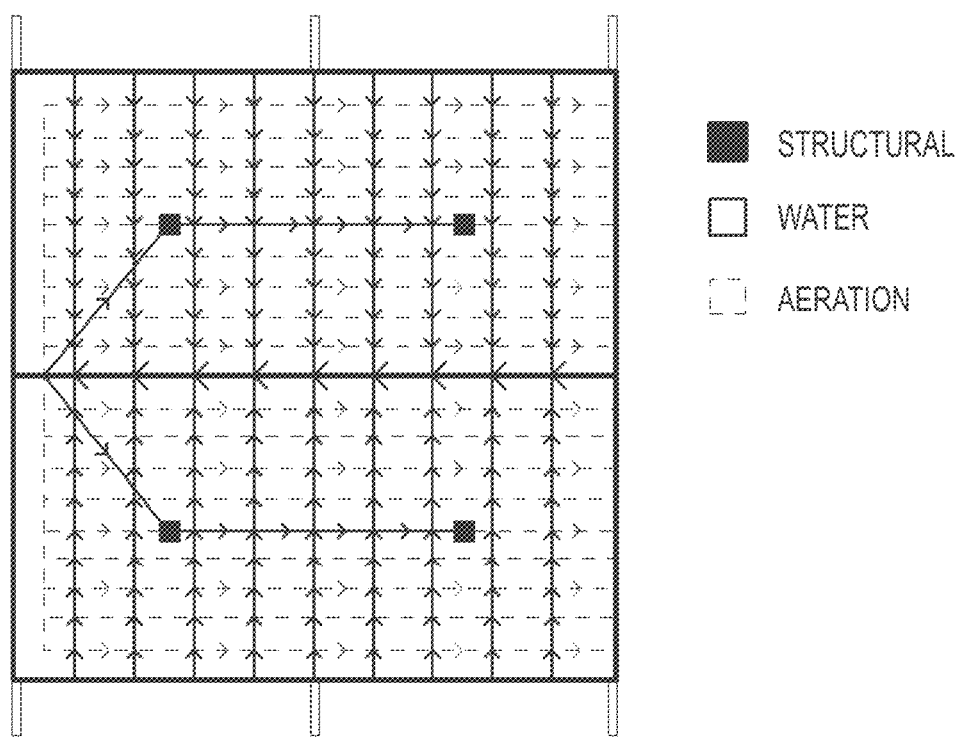
Figure 2B:
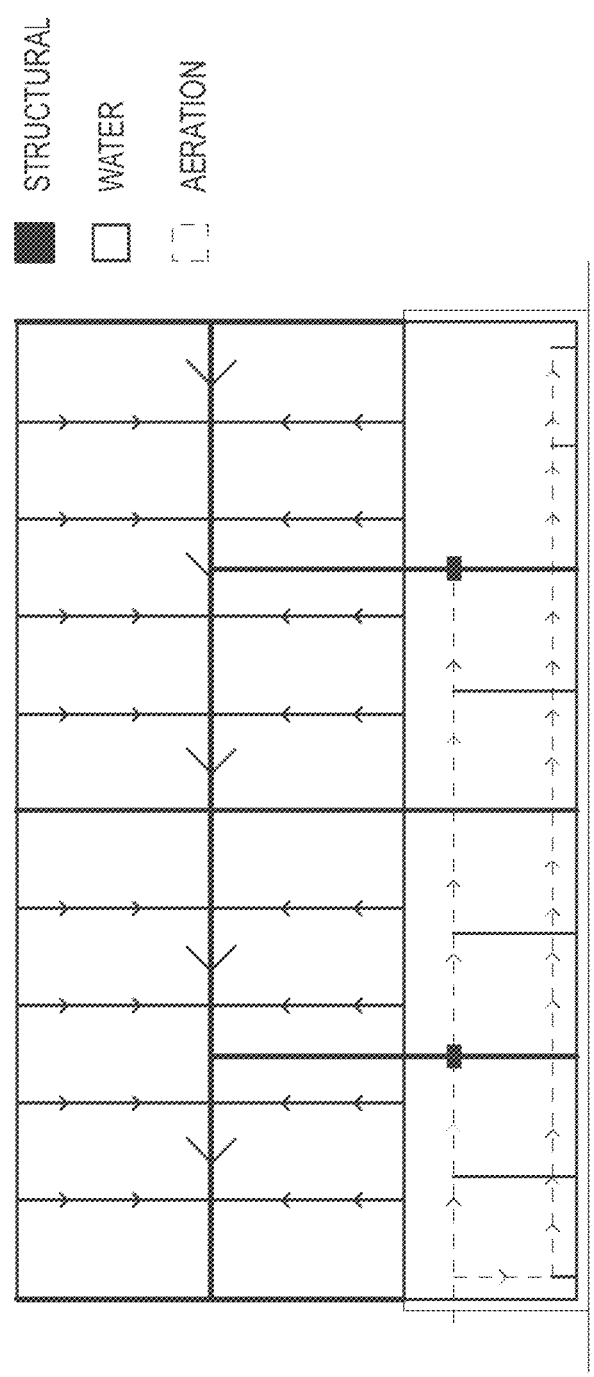

Referring now to FIGS. 2A, 2B, and 2C, the heat trapping tank has insulated vertical walls and a roof. In some embodiments, the roof may be a sloping roof, as illustrated in FIG. 2C. In embodiments, the roof may be made of glass, such as, by way of non-limiting example, low-iron glass. The glass roof may, in some embodiments, comprise or take the form of at least one parabolic mirror, which may have at least one focal point within or on a surface of the non-potable water in the heat trapping tank. In some embodiments, such as those illustrated in FIGS. 2A and 2B, at least one of the non-potable water and the injected hot air may flow and/or be pumped through multiple lines. In some embodiments, the non-potable water and injected hot air are made to flow in perpendicular directions; FIG. 2A illustrates one such embodiment, wherein the non-potable water flows either north or south while the injected hot air flows east. Alternatively or in addition, the non-potable water and the injected hot air may be made to flow in opposing directions; FIG. 2B illustrates one such embodiment, wherein the non-potable water flows up while the injected hot air flows down. The heat trapping tank may also have an insulated base, which may be made, by way of non-limiting example, of concrete. The insulated walls may form a box structure, as illustrated in FIGS. 2A through 2C, and may be made, by way of non-limiting example, of steel.

Figure 3:
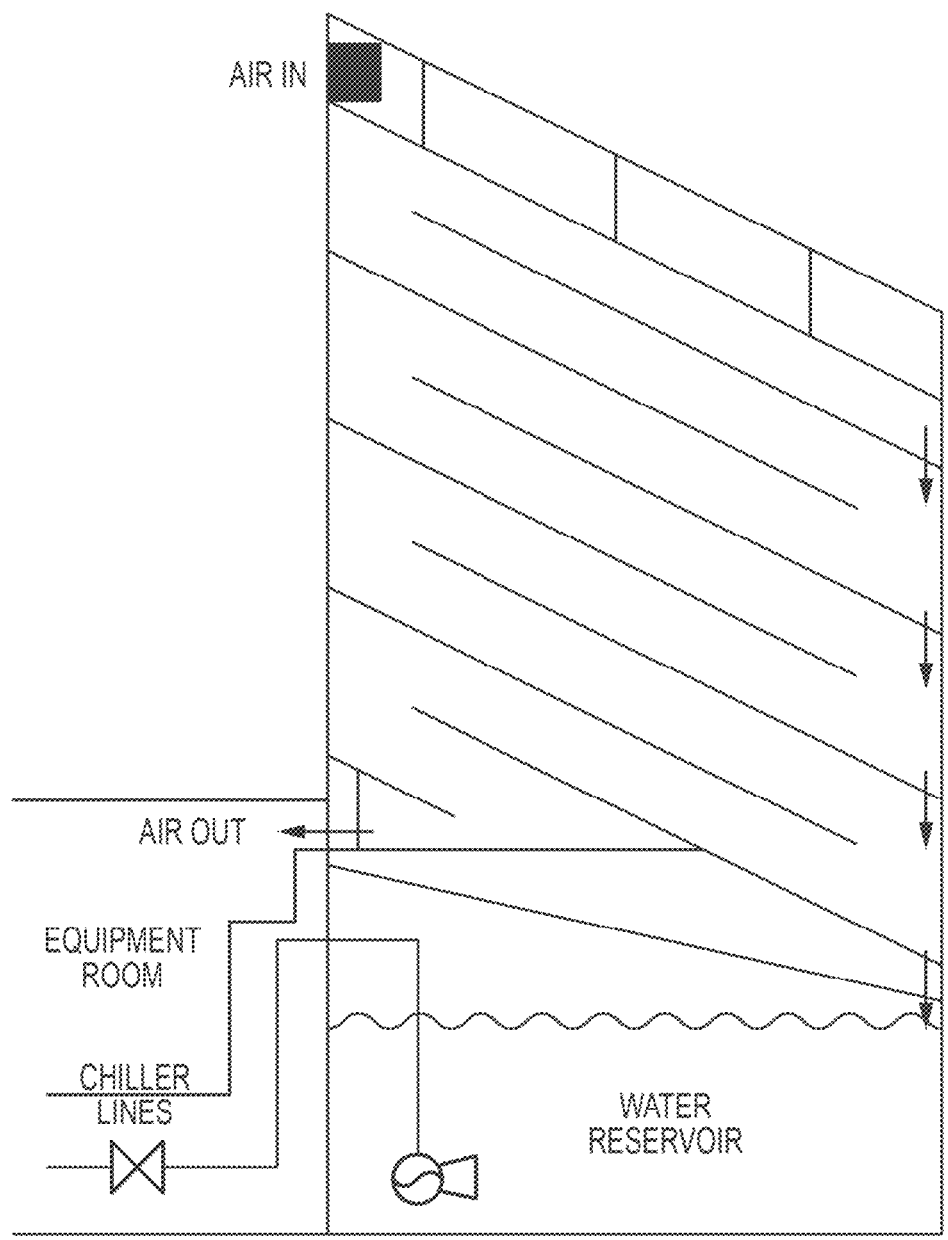
FIG. 3 is a side view of a cooling tower for a water purification system, according to embodiments of the present invention.

Referring now to FIG. 3, air saturated with water vapor enters the cooling tower near the top of the cooling tower and flows through a plurality of cooling coils. The cooling coils are, in the embodiment illustrated in FIG. 3, disposed roughly parallel to each other and take the form of long linear structures extending from vertical walls of the cooling tower. This design provides greater surface area for cooling of the saturated air to take place and induces turbulent flow in the saturated air, ensuring that the saturated air is well-mixed and that laminae having different temperatures and thus different water contents do not form. This design also allows water to condense on the surfaces of the cooling coils and fall into a water reservoir at the base of the cooling tower. Near the bottom of the cooling tower but above the water level in the water reservoir, the now-cool, dry air flows or is pumped into the equipment and control room, near a top of the equipment and control room. In some embodiments, as illustrated in FIG. 3, chiller lines may also run from the water reservoir of the cooling tower into the equipment and control room. The cool, dry air, and optionally the chiller lines, remove heat from equipment in the equipment and control room, and may flow or be pumped into the heat trapping tank to assist in evaporating water vapor out of the non-potable water. The cooling tower preferably is not taller than an abutting wall of the heat trapping tank so as not to cast a shadow over the heat trapping tank.

Figure 4:
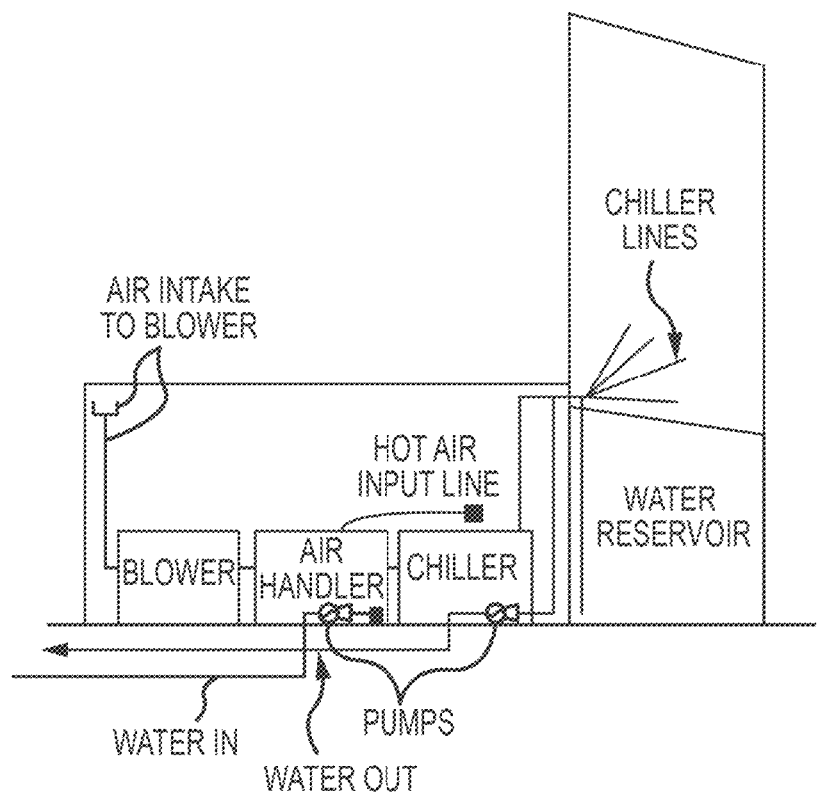
FIG. 4 is a schematic diagram of an equipment and control room and a heat recovery subsystem for a water purification system, according to embodiments of the present invention.

Referring now to FIG. 4, an equipment and control room according to embodiments of the present invention is illustrated. In this embodiment, equipment in the equipment and control room comprises a chiller, an air handler, and a blower. Cool, dry air from the cooling tower may flow or be pumped through the chiller and into the air handler, where it may be mixed with hot air brought in via an input line. The blower may then send this combined warm, dry air into the heat trapping tank to assist in evaporating water vapor out of the non-potable water. The chiller may comprise a pump for pumping water from the water reservoir of the cooling tower out of the system, and the air handler may comprise a pump for taking in water from outside the system.

Figure 5:
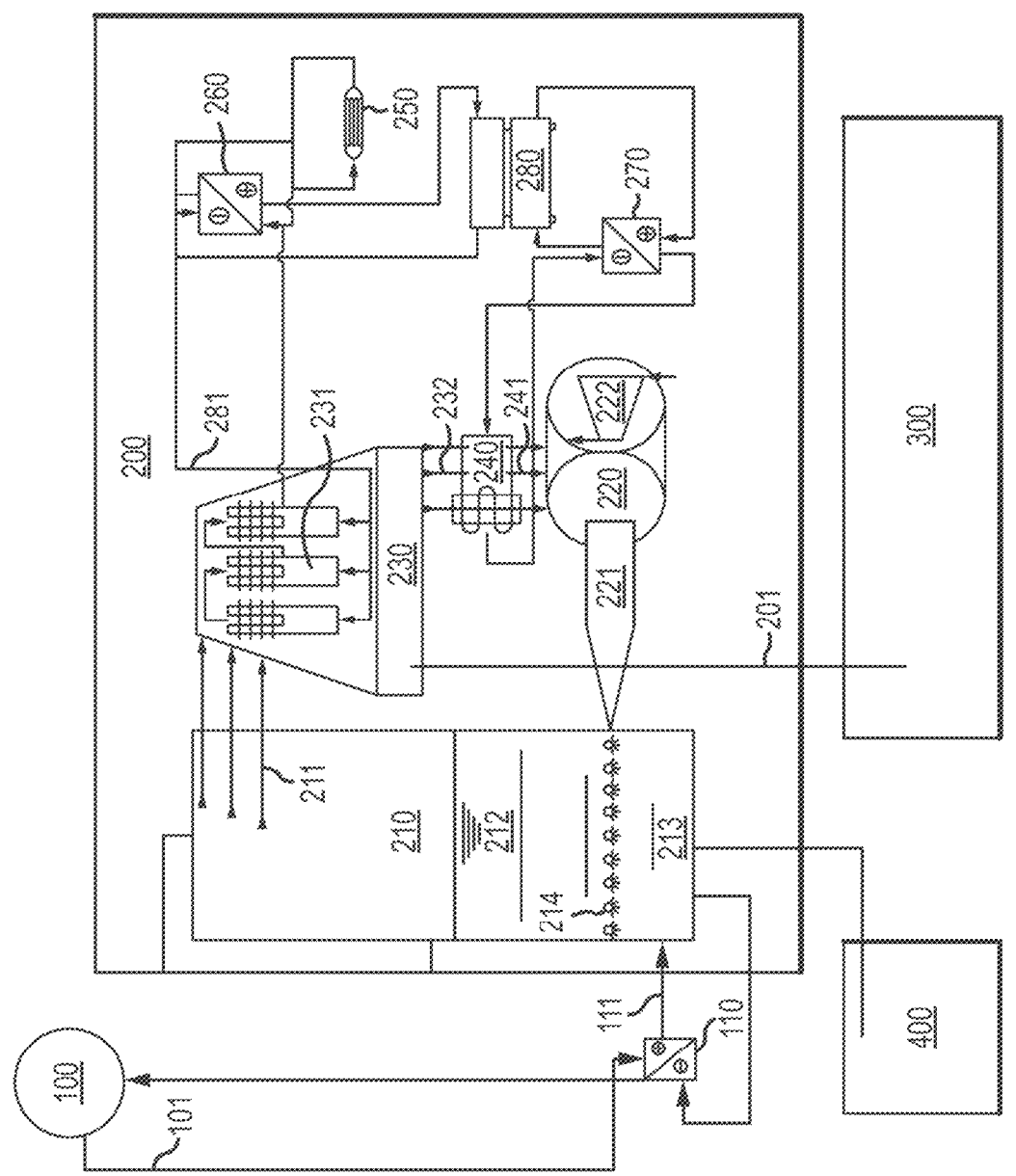
FIG. 5 is a schematic diagram of a water purification system, according to embodiments of the present invention.

Referring now to FIG. 5, a water purification system is illustrated, comprising a solar collector 100, a super-insulated structure 200, a distilled water reservoir 300, and a concentrated effluent reservoir 400. In the system of FIG. 5, the solar collector 100 collects solar energy 101 and uses the solar energy 101 to heat a heat transfer fluid. By way of non-limiting example, the solar collector 100 may comprise a parabolic trough solar collector, as described, for example, in PCT Patent Application Publication 2015/103559 to Viljoen et al., the entirety of which is herein incorporated by reference, and the heat transfer fluid may comprise at least one of a synthetic oil and a molten salt. The heat transfer fluid exchanges heat with non-potable water, such as seawater, brackish water, industrial waste water, treated effluent water, or mixtures thereof, thereby heating the non-potable water. In the embodiment illustrated in FIG. 5, the exchange of heat from the heat transfer fluid to the non-potable water takes place in a solar collector heat exchanger 110 outside the super-insulated structure 200, but may also take place within the super-insulated structure 200. The heated non-potable water 111 enters a distillation tower 210 within the super-insulated structure 200, which receives compressed air 221 from a high-volume low-pressure (HVLP) blower 220 within the super-insulated structure 200. The compressed air 221 preferably has a temperature of between about 208° F. and about 210° F., i.e. just below the boiling point of pure water, to speed separation of the heated non-potable water 111 into water vapor 212, which rises to form saturated air 211, and a concentrated effluent 213. The temperature of the compressed air 221 and the vertical point at which it is injected into the distillation tower 210, which is preferably above a level of the concentrated effluent 213 and most preferably at a vertical midpoint of a water column comprising the heated non-potable water 111 and the concentrated effluent 213, are selected to substantially prevent convection and thus avoid sudden boiling or "flashing" of either the heated non-potable water 111 or the concentrated effluent 213, which may adversely affect system performance. By way of non-limiting example, the heated non-potable water 111 and the concentrated effluent 213 may form a water column having a height of ten feet, in which case the compressed air 221 is most preferably injected into the distillation tower 210 at a vertical midpoint of the water column, i.e. at a height of five feet. In preferred embodiments, the compressed air 221 is injected by a plurality of microbubble nozzles 214. The concentrated effluent 213 may, as illustrated in FIG. 5, be passed out of the super-insulated structure 200 and into the concentrated effluent reservoir 400 for further treatment, such as, by way of non-limiting example, further recovery of water and/or salt by processes known and described in the art. The saturated air 211 is then passed to a cooling tower 230 within the super-insulated structure 200, comprising a plurality of cooling coils 231. As a result of the cooling of the saturated air 211, substantially pure distilled water 201 condenses out of the saturated air 211, whereupon the substantially pure distilled water 201 is passed out of the super-insulated structure 200 and into the distilled water reservoir 300 and, optionally, into a supply pipeline (not shown). After condensation, the resulting cool, dry air 232, or some portion thereof, is passed to a reheat tower 240 within the super-insulated structure 200, where it is heated to form preheated air 241. This preheated air 241 is then provided to the HVLP blower 220 as at least a portion of intake air compressed by the HVLP blower 220 to form the compressed air 221 that is injected into the distillation tower 210.

A distinct benefit of the present invention, and in particular of the embodiment illustrated in FIG. 5, is substantial energy savings as compared to current water purification systems and processes. In particular, the use of the super-insulated structure 200 to enclose most of the components of the system ensures that any waste heat, e.g. heat that escapes from the distillation tower 210 or reheat tower 240 by radiation or convection, is captured and retained for further heating use. Likewise, because no motor is 100% efficient, any motor within the super-insulated structure 200, e.g. a compressor motor 222 within the HVLP blower 220, may, in addition to providing shaft work, put out some amount of waste heat; this waste heat is substantially retained by the super-insulated structure 200 and may be recovered by a mechanical heat recovery means 250 within the super-insulated structure 200. The super-insulated structure 200 may be made of any suitable material, such as, by way of non-limiting example, concrete and/or steel, and may in some embodiments take the shape of a box. As illustrated in FIG. 5, the mechanical heat recovery means 250 may work in conjunction with other elements within the super-insulated structure 200, such as further heat exchangers 260, 270, to further improve the energy efficiency of the system. In particular, a chiller 280, which provides fluid 281 for use in the plurality of cooling coils 231 in the cooling tower 230, may put out recoverable heat in the form of waste heat, i.e. from a motor, and/or a hot outlet stream.

Figure 6:
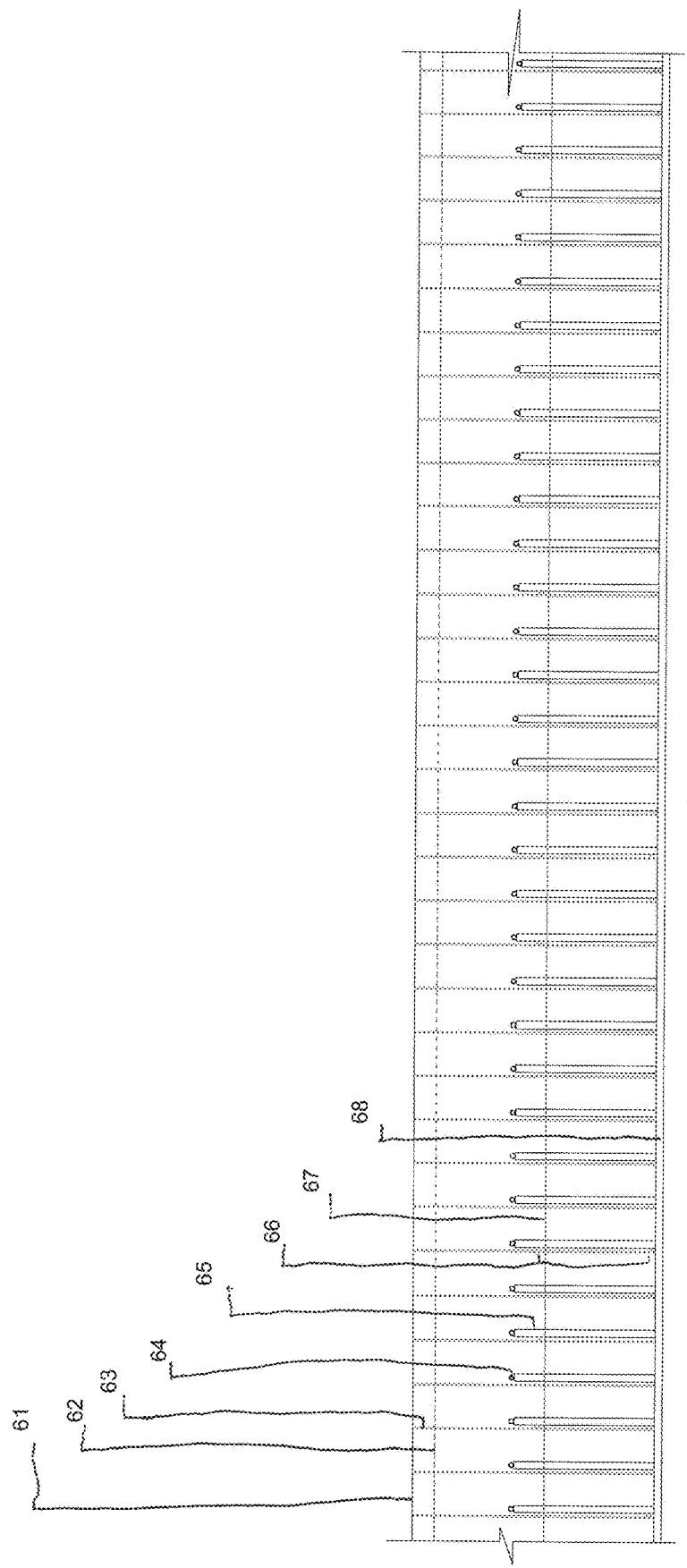
FIG. 6 is a schematic diagram of a device to enable easy maintenance of water purification systems, according to embodiments of the present invention.

Referring now to FIG. 6, a device, by which a rigid pipe grid of a water purification system may be raised and/or lowered, is illustrated in cross-section. The device employs a series of vertical stand tubes 65, taking the form of pneumatic cylinders, to support the pipe grid. The vertical stand tubes 65 may be inflated with air and thus rise along guides 63 to expose the pipes 64 of the pipe grid above the water line 62, enabling a technician to perform service or maintenance of the pipe grid. The guides 63 extend from a floor 68 of a desalination vessel above a water line 62 inside the desalination vessel (and in some embodiments to the top 61 of the desalination vessel), while the vertical stand tubes 65, when not inflated, extend from the floor to a point below the water line 62 but above a brine separator diaphragm 67. When the service or maintenance is completed, the air may be released from the vertical stand tubes 65, and the pipe grid may then descend the guides 63 into its original position below the water line 62. The guides 63 may be constructed of, by way of non-limiting example, brass. The vertical stand tubes 65 may also be provided with, associated with, and/or disposed within channel guides 66, as shown.

The invention illustratively disclosed herein suitably may be practiced in the absence of any element which is not specifically disclosed herein. It is apparent to those skilled in the art, however, that many changes, variations, modifications, other uses, and applications of the invention are possible, and also changes, variations, modifications, other uses, and applications which do not depart from the spirit and scope of the invention are deemed to be covered by the invention, which is limited only by the claims which follow.

The foregoing discussion of the invention has been presented for purposes of illustration and description. The foregoing is not intended to limit the invention to the form or forms disclosed herein. In the foregoing Detailed Description of Certain Embodiments of the Invention, for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description of Certain Embodiments of the Invention, with each claim standing on its own as a separate preferred embodiment of the invention.

Moreover, though the description of the invention has included description of one or more embodiments and certain variations and modifications, other variations, combinations, and modifications are within the scope of the invention, e.g. as may be within the skill and knowledge of those in the art, after understanding the present disclosure. It is intended to obtain rights which include alternative embodiments to the extent permitted, including alternate, interchangeable, and/or equivalent structures, functions, ranges, or steps to those claimed, whether or not such alternate, interchangeable, and/or equivalent structures, functions, ranges, or steps are disclosed herein, and without intending to publicly dedicate any patentable subject matter.

What is claimed is:

1. A system for purifying water, comprising:
  a solar energy collection device, collecting solar energy and heating a heat transfer fluid in a heat exchanger, the heat exchanger receiving and heating non-potable water;
  a super-insulated structure, comprising:
    a distillation tower, receiving the heated non-potable water;
    a high-volume low-pressure (HVLP) blower, compressing intake air to form compressed air having a temperature of between about 208° F. and about 210° F., and injecting the compressed air into the distillation tower to form saturated air and a concentrated effluent in the distillation tower, wherein the compressed air enters the distillation tower via a plurality of microbubble nozzles located at a vertical midpoint of a water column comprising the heated non-potable water and the concentrated effluent;

a cooling tower, receiving the saturated air from the distillation tower and comprising a plurality of cooling coils, the plurality of cooling coils cooling the saturated air to form distilled water and cool, dry air;

a reheat tower, receiving at least a portion of the cool, dry air from the cooling tower, heating the portion of the cool, dry air to form preheated air, and providing the preheated air to the HVLP blower as at least a portion of the intake air;

a heat recovery subsystem, comprising a chiller, an air handler, and a blower, for recovering at least a portion of waste heat generated by the system; and a chiller, chilling a fluid used by the cooling coils of the cooling tower, returning the fluid to the cooling coils, and expelling waste heat to the reheat tower for use in heating the portion of the cool, dry air;

a distilled water reservoir, receiving the distilled water from the cooling tower; and a concentrated effluent reservoir, receiving the concentrated effluent from the distillation tower for subsequent treatment, wherein the distillation tower receives at least one of the heated non-potable water and the compressed air via a plurality of pipes, wherein the distillation tower comprises a plurality of substantially vertical pneumatic tubes supporting the plurality of pipes, whereby the vertical pneumatic tubes may be selectively inflated to raise the plurality of pipes at least partially above a height of the water column within the distillation tower and selectively deflated to lower the plurality of pipes below the height of the water column within the distillation tower.

2. The system of claim 1, wherein the super-insulated structure is made substantially of concrete.

3. The system of claim 1, wherein the super-insulated structure is made substantially of steel.

4. The system of claim 1, wherein the super-insulated structure forms a box structure.

5. The system of claim 1, wherein the solar energy collection device comprises a parabolic trough solar collector.

6. The system of claim 1, further comprising a pump configured to pump the distilled water in the distilled water reservoir into a supply pipeline.

\* \* \* \* \*